(12) United States Patent
Elbacher et al.

(10) Patent No.: US 11,867,241 B2
(45) Date of Patent: Jan. 9, 2024

(54) FREEWHEELING ELEMENT

(71) Applicant: PAUL MULLER GMBH & CO. KG UNTERNEHMENSBETEILIGUNGEN, Nuremberg (DE)

(72) Inventors: Manfred Elbacher, Nuremberg (DE); Andreas Radke, Nuremberg (DE)

(73) Assignee: PAUL MULLER GMBH & CO. KG UNTERNEHMENSBETEILIGUNGEN, Nuremberg (DE)

( * ) Notice: Subject to any disclaimer, the term of this patent is extended or adjusted under 35 U.S.C. 154(b) by 0 days.

(21) Appl. No.: 17/772,823

(22) PCT Filed: Oct. 23, 2020

(86) PCT No.: PCT/DE2020/100914
§ 371 (c)(1),
(2) Date: Apr. 28, 2022

(87) PCT Pub. No.: WO2021/083458
PCT Pub. Date: May 6, 2021

(65) Prior Publication Data
US 2022/0403895 A1   Dec. 22, 2022

(30) Foreign Application Priority Data
Oct. 29, 2019   (DE) .......................... 202019106004.2

(51) Int. Cl.
*F16D 41/07* (2006.01)
*F16C 33/38* (2006.01)
*F16D 41/067* (2006.01)

(52) U.S. Cl.
CPC ............ *F16D 41/076* (2013.01); *F16C 33/38* (2013.01); *F16D 41/067* (2013.01)

(58) Field of Classification Search
CPC ....... F16D 41/067; F16D 41/076; F16C 33/38
See application file for complete search history.

(56) References Cited

U.S. PATENT DOCUMENTS 3,006,447 A   10/1961   Irwin
5,664,653 A    9/1997   Kurita

FOREIGN PATENT DOCUMENTS

| DE | 1264886 | * | 4/1966 | ............ F16D 41/07 |
|----|---------|---|--------|------------------------|
| DE | 1264886 B | | 3/1968 | |
| DE | 1267039 B | | 4/1968 | |
| DE | 102006038201 A1 | | 2/2009 | |
| EP | 2660448 B1 | | 7/2017 | |

* cited by examiner

*Primary Examiner* — Huan Le
(74) *Attorney, Agent, or Firm* — Hayes Soloway PC

(57) ABSTRACT

The invention relates to a freewheeling element comprising a cage, a plurality of clamping bodies, each of the clamping bodies being received in an associated clamping body pocket formed in the cage, and a plurality of rolling bodies, each of the rolling bodies being received in an associated rolling body pocket formed in the cage, the cage having a higher resilience than the clamping bodies and the rolling bodies.

12 Claims, 3 Drawing Sheets

FREEWHEELING ELEMENT

CROSS-REFERENCE TO RELATED APPLICATIONS AND PRIORITY

This patent application claims priority from PCT Application No. PCT/DE2020/100914 filed Oct. 23, 2020, which claims priority from German Patent Application No. 20 2019 106 004.2 filed Oct. 29, 2019. Each of these patent applications are herein incorporated by reference in their entirety.

TECHNICAL FIELD

The invention relates to a freewheeling element.

BACKGROUND OF THE INVENTION

Freewheeling elements are used, for example, in directional clutches which, in one direction, transmit and/or support a torque by way of a force fit and, in the opposite direction, allow idling. In the case of sprag clutches, sprags are located in the so-called clamping position when they are transmitting the torque by a force fit, i.e. a friction fit, and are located in the so-called freewheeling position when they allow idling.

In addition to the sprags, conventional sprag clutches have, inter alia, a cage, in which the sprags are accommodated in pockets. Such a sprag clutch is disclosed in EP 2 660 488 A1. The disadvantage with prior-art sprag clutches is that additional mounting is required, since a classic freewheel does not have any bearing property, and therefore has no load-bearing capacity.

SUMMARY OF THE INVENTION

The object of the present invention is to provide a freewheeling element which has load-bearing capacity integrated in it.

This object is achieved by a freewheeling element having the features of claim 1. Advantageous embodiments of the freewheel are described in the dependent claims.

The freewheeling element according to the invention has a cage, a plurality of sprags, and a plurality of rolling bodies. Each of the sprags is accommodated in a respective sprag pocket formed in the cage. Each of the rolling bodies is accommodated in a respective rolling-body pocket formed in the cage. The cage has a higher level of elasticity than the sprags and the rolling bodies.

The provision of rolling bodies allows the load-bearing capacity to be integrated in the freewheeling element. Furthermore, the higher level of elasticity in comparison with the sprags and the rolling bodies means that the cage acts as a resilient element. Otherwise required metallic springs in the form of spring-loading elements can thus be dispensed with. In addition, selecting a cage material with a certain level of elasticity makes it possible for the spring-loading behavior of the sprags and/or the positional stability of the rolling bodies to be adjusted over a wide range.

The sprags and the rolling bodies are preferably produced from a metallic material, in particular from a steel material. Accordingly, the cage then has a level of elasticity which is greater than the elasticity of metallic materials. However, it is also possible to use, for example, rolling bodies made of a ceramic material. In this case, the cage then has a level of elasticity which is greater than that of the metallic and ceramic materials used.

The rolling-body pockets—and therefore also the rolling bodies accommodated in these rolling-body pockets—are preferably distributed in an equidistant manner over the circumference of the cage. This makes it possible to achieve uniform support along the circumference and to increase the load-bearing capacity of the freewheel in a correspondingly uniform manner.

The provision of an odd number of rolling-body pockets along the circumference of the cage has been found to be advantageous. It is particularly advantageous here for three, five or seven rolling-body pockets distributed in an equidistant manner to be provided. The greater the number of rolling bodies, the greater is the load-bearing capacity, although this is at the expense of the freewheeling character of the element.

In an advantageous embodiment, the rolling bodies are accommodated in the rolling-body pockets in a form-fitting manner, in particular in the manner of a latching or snap-fit connection. On the one hand, this allows the rolling bodies to be easily installed and removed; on the other hand, reliable mounting of the rolling bodies can be achieved. The elastic property of the cage material allows the rolling-body pocket to be expanded elastically in order for the rolling body to be latched or snap-fitted into the pocket.

In an advantageous embodiment, the cage consists of a polymer material, in particular of a polyamide. The polymer material preferably contains fillers, in particular in the form of fibers and/or balls. Glass-fiber-reinforced polyamide, particularly preferably PA 66 GF 25 (polyamide with a 25% glass-fiber fraction) is a particularly suitable material for the cage. It is possible for just the regions of the cage around the rolling-body pockets and/or the sprag pocket and for the entire cage to consist of the aforementioned materials. Use of the aforementioned materials makes it possible to achieve a particularly advantageous resilient behavior of the cage. It is also possible, by selecting the material and/or the mixing ratio of basic polymer substance to filler, to adapt the level of elasticity and the resilient behavior of the cage.

BRIEF DESCRIPTION OF THE DRAWINGS

The invention is explained further with reference to an exemplary embodiment in the figures, in which.

DETAILED DESCRIPTION

Figure 1:
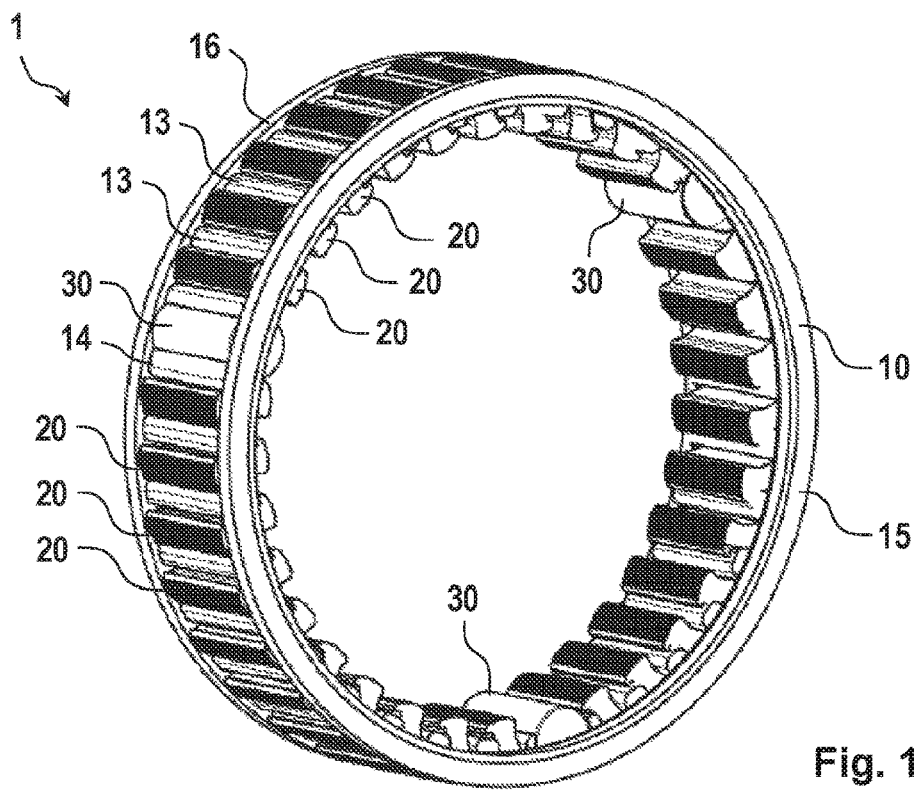
FIG. 1 shows a perspective view of a freewheeling element.
Figure 2:
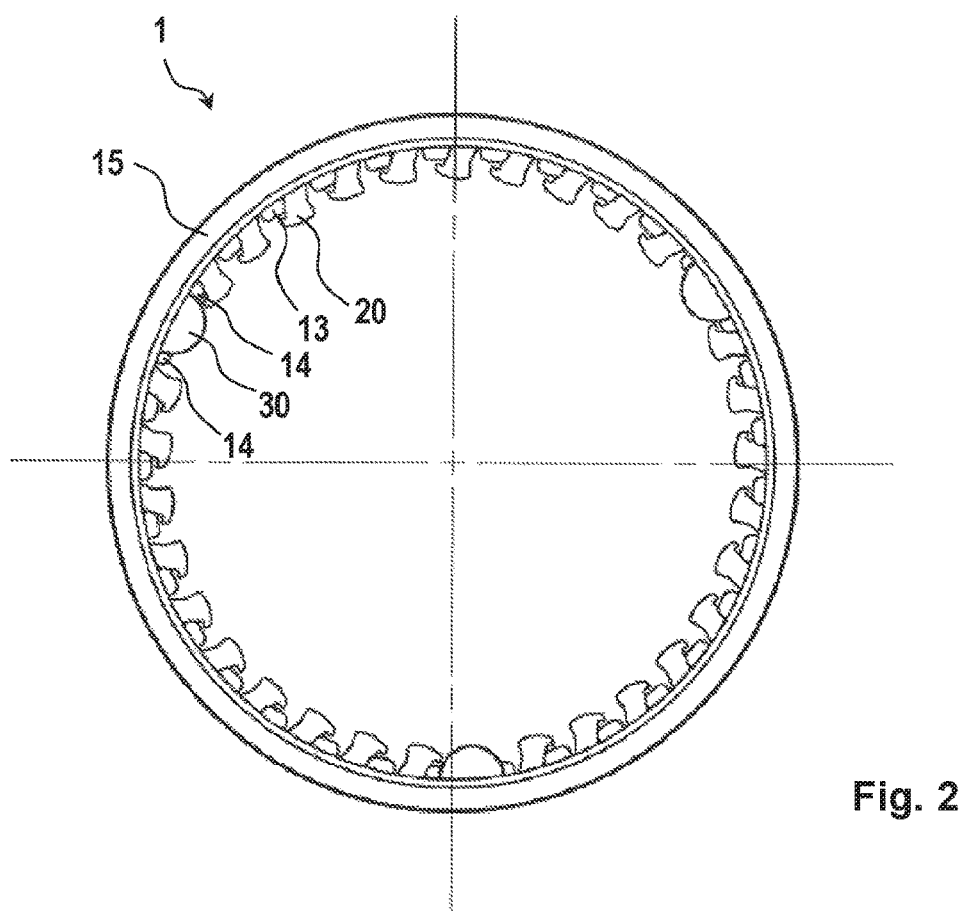
FIG. 2 shows a front view of the freewheeling element from FIG. 1.
Figure 3:
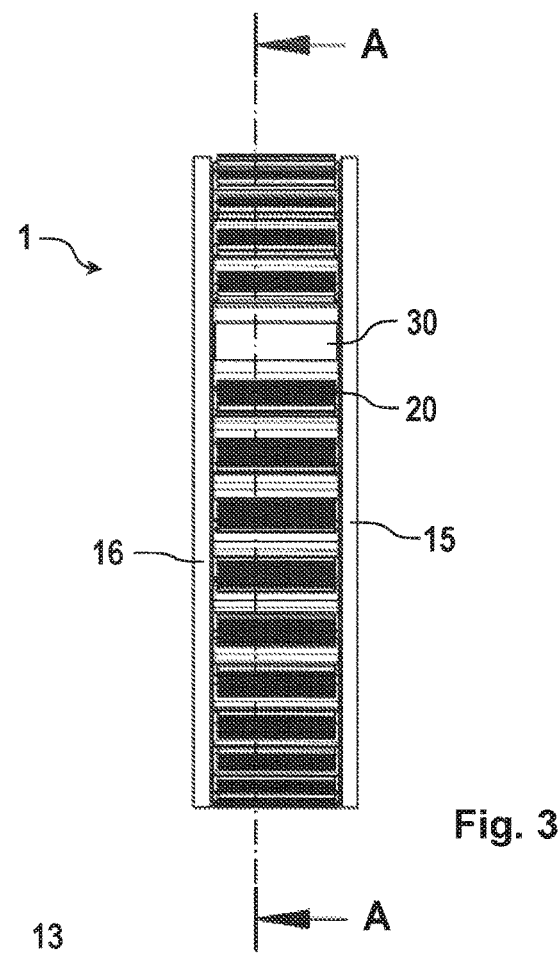
FIG. 3 shows a side view of the freewheeling element from FIG. 2.
Figure 4:
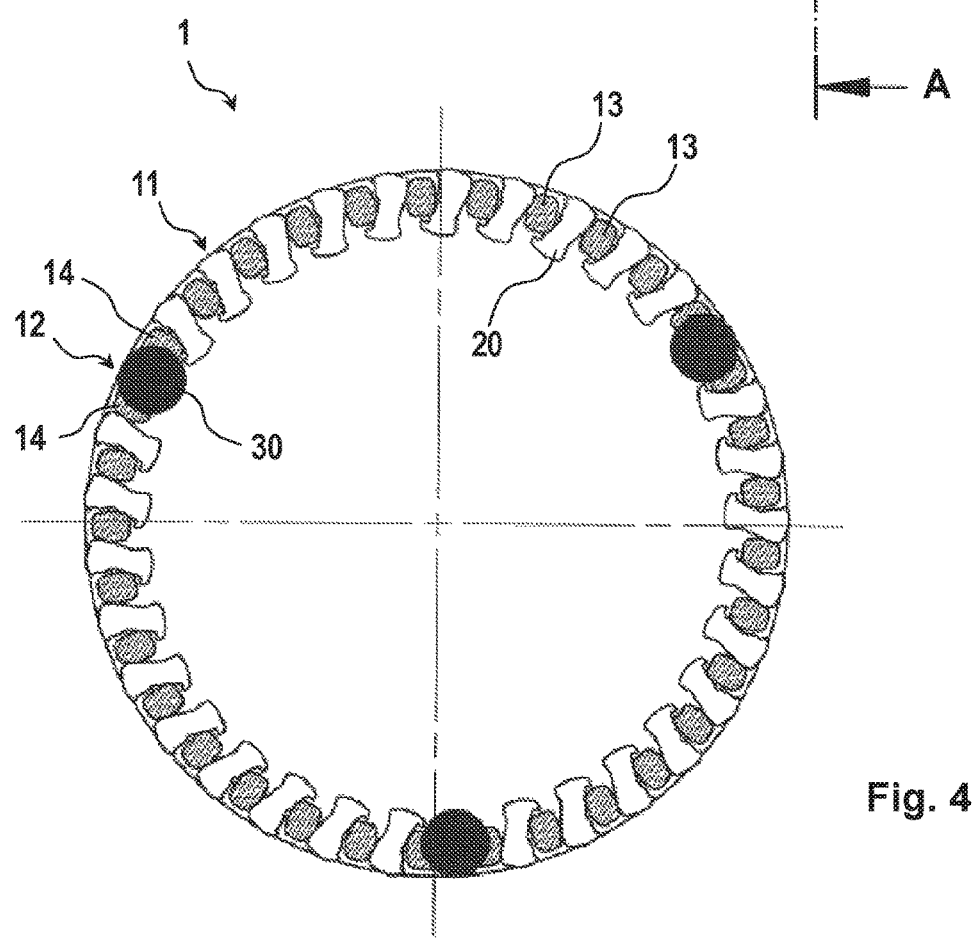
FIG. 4 shows a sectional view taken along section plane A-A from FIG. 3.

The freewheeling element 1 illustrated in the figures is of essentially annular design and has a cage 10 made of a polymer material (e.g. polyamide 66 with a 25% glass-fiber fraction). A plurality of sprag pockets 11 and a total of three rolling-body pockets 12 are formed in the cage 10. For reasons of clarity, not all the elements which appear a number of times are provided with a separate reference sign in the figures. Thus, for example, just one sprag pocket 11 is provided with a reference sign in FIG. 4. The sprag pockets 11 and the rolling-body pockets 12 here constitute apertures and/or holes in the cage 10. In other words, the cage 10 has axially running first and second crosspieces 13 and 14 and also annular terminating flanges 15, 16. The spatial volume between in each case two adjacent crosspieces 13, 14 and the two terminating flanges 15, 16 forms in each case a sprag pocket 11 and a rolling-body pocket 12. The crosspieces 13 are each essentially cuboidal and have a convex cross section in the axial direction of the freewheeling element 1. In each case a plurality of sprag pockets 11 are arranged, between two rolling-body pockets 12, in the circumferential direction of the freewheeling element.

A respective sprag 20 is accommodated in each of the sprag pockets 11. The connection between the sprag 20 and cage 10 here is designed in the form of a snap-fit connection. The sprags 20 are produced from a steel material.

A respective rolling body 30 is accommodated in each of the rolling-body pockets 12, wherein the rolling body 30 is designed in the form of a cylindrical roller and is produced from a steel material. The connection between the rolling body 30 and cage 10 here is likewise designed in the form of a snap-fit connection. The rolling-body pocket 12 here is embodied such that it encloses or surrounds the rolling bodies 30 from two sides (overlap), and therefore the roller-form rolling body 30 is retained in the cage 10. At the same time, the amount of overlap is selected to be small enough for the elastic property of the cage material coupled with simple manual force to be sufficient to allow the rolling-body pocket to be expanded elastically in order for the rolling body 30 to be clicked/snap-fitted into the rolling-body pocket 12.

The rolling-body pockets 12 are designed to be wider in the circumferential direction than the sprag pockets 11. In other words, the first crosspieces 13 are at a smaller distance from one another than the second crosspieces 14.

The level of elasticity of the cage 10—in particular the level of elasticity of the crosspieces 13, 14—is higher than the level of elasticity of the sprags 20 and the rolling bodies 30. This higher level of elasticity of the crosspieces 13, 14 is achieved, in particular, by the cage 10 (or at least the crosspieces 13, 14) being produced from a material which has a higher modulus of elasticity than the materials from which the sprags 20 and the rolling bodies 30 are produced.

Figure 5:
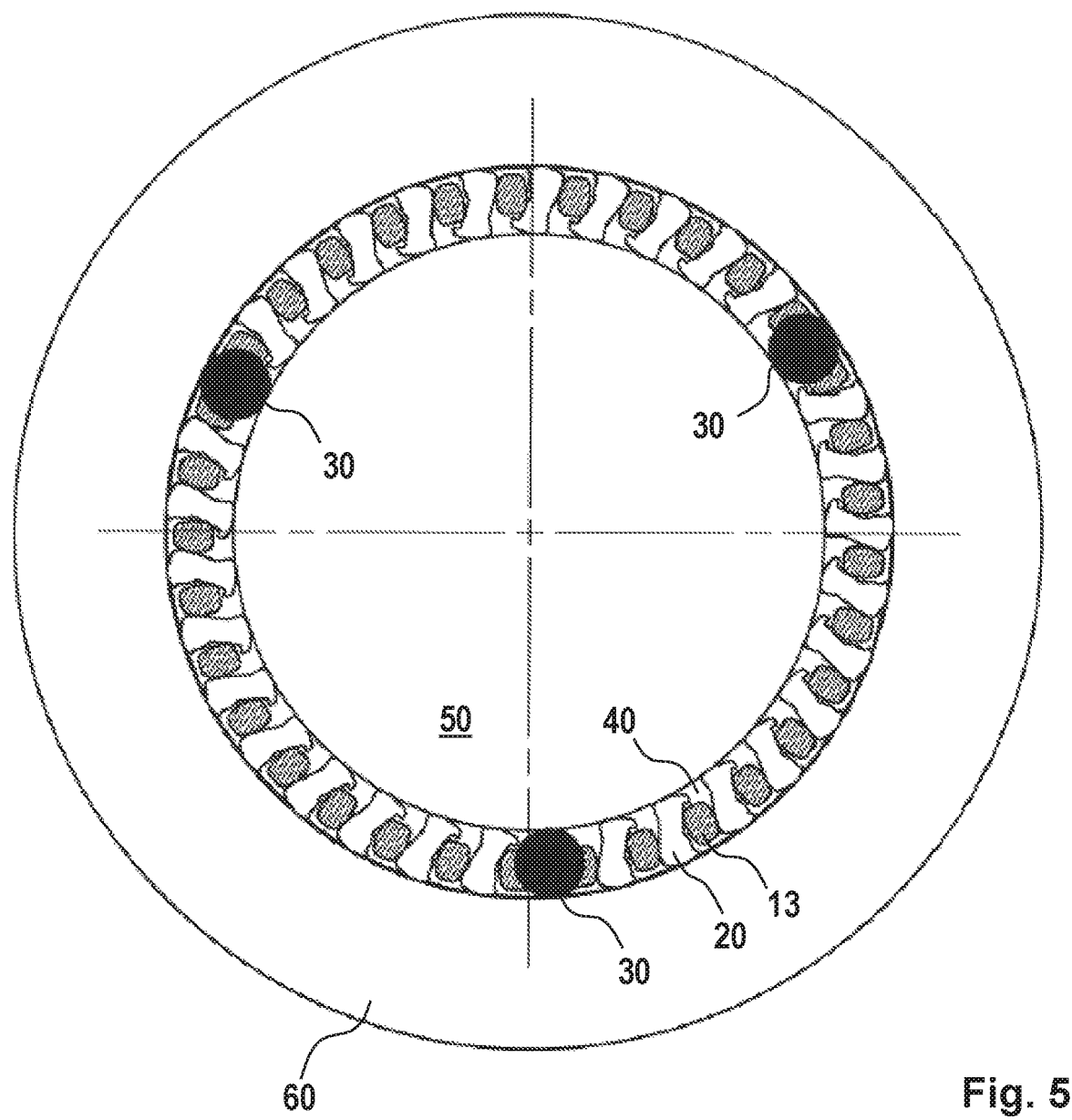
FIG. 5 shows an example of an installed state of the freewheeling element illustrated in FIG. 4.

FIG. 5 shows an example of the freewheeling element 1 being installed in a gap 40 between an inner, first (fully) cylindrical component 50 and an outer, second hollow-cylindrical component 60. The dimensions and the shape of the components 50 and 60 here should be considered to be purely illustrative. The first component 50 is arranged coaxially in relation to the second component 60. The freewheeling element 1 is arranged within said gap 40. In a clamping position, the sprags 20 form a frictionally fitting connection with the first component 50 and the second component 60. In a freewheeling position, in contrast, the sprags 20 allow the first component 50 to rotate relative to the second component 60. Each of the crosspieces 13 has a spring-loading surface. In the freewheeling position, the adjacent sprag 20 is in contact with this spring-loading surface. More precisely, in the freewheeling position, surface-area contact and/or an overlap forms between the spring-loading surface of the crosspiece 13 and the adjacent sprag 20. In the clamping position, in contrast, the sprag 20 is not in contact with the spring-loading surface of the crosspiece 13.

Both in the clamping position and in the freewheeling position, the rolling bodies 30 are in contact with the first component 50 and the second component 60 and provide for low-friction mounting of the two components 50 and 60. In this way, the freewheeling element 1 has a high load-bearing capacity and, at the same time, can serve as a direction-dependent clutch.

The freewheeling element 1 illustrated in the figures therefore has a cage 10, a plurality of sprags 20, and a plurality of rolling bodies 30. The sprags 20 and the rolling bodies 30 are accommodated in the sprag pocket 11 and the rolling-body pocket 12, respectively, by means of latching or snap-fit connections. The cage 10 has a higher level of elasticity than the sprags 20 and the rolling bodies 30. The total of three rolling-body pockets 12 are distributed in an equidistant manner over the circumference of the cage 10.

The invention claimed is:

1. A freewheeling element having:
   a cage,
   a plurality of sprags, wherein each of the sprags is accommodated in a respective sprag pocket formed in the cage, and
   a plurality of rolling bodies, wherein each of the rolling bodies is a cylindrical roller accommodated in a respective rolling-body pocket, formed in the cage,
   wherein the cage has a higher level of elasticity than the sprags and the rolling bodies,
   wherein two or more of the plurality of sprag pockets are formed, between adjacent rolling-body pockets, along a circumference of the cage,
   wherein the rolling bodies are accommodated in the rolling-body pockets in a removable latching or snap-fit connection, and
   wherein the sprags are accommodated in the sprag pockets in a removable latching or snap-fit connection.

2. The freewheeling element of claim 1, wherein the rolling-body pockets are distributed in an equidistant manner along a circumference of the cage.

3. The freewheeling element of claim 2, wherein the rolling bodies are accommodated in the rolling-body pockets in a form-fitting manner.

4. The freewheeling element of claim 1, the respective rolling-body pockets consisting of an odd number of rolling-body pockets.

5. The freewheeling element of claim 4, wherein exactly three, five or seven rolling-body pockets are formed.

6. The freewheeling element of claim 1, wherein the sprags are accommodated in the sprag pockets in a form-fitting manner.

7. The freewheeling element of claim 1, wherein the cage consists of a polymer material.

8. The freewheeling element of claim 7, wherein the polymer material contains fillers.

9. The freewheeling element of claim 7, wherein the polymer material contains fillers, specifically fibers and/or balls.

10. The freewheeling element as of claim 1, wherein the cage consists of a glass-fiber-reinforced polyamide.

11. The freewheeling element of claim 1, wherein the cage consists of a polyamide.

12. The freewheeling element as of claim 1, wherein the cage consists of a glass-fiber-reinforced polyamide, specifically PA 66 GF 25.

* * * * *

UNITED STATES PATENT AND TRADEMARK OFFICE
CERTIFICATE OF CORRECTION

PATENT NO. : 11,867,241 B2
APPLICATION NO. : 17/772823
DATED : January 9, 2024
INVENTOR(S) : Manfred Elbacher and Andreas Radke Page 1 of 1

It is certified that error appears in the above-identified patent and that said Letters Patent is hereby corrected as shown below:

In the Claims

Column 4, Claim 9, Line 5, after "fillers,", remove --specifically--.

Signed and Sealed this
Twenty-eighth Day of January, 2025

Coke Morgan Stewart
*Acting Director of the United States Patent and Trademark Office*